Dec. 21, 1943.  W. P. STUCKERT ET AL  2,337,528
TUBE HOLDING APPARATUS
Filed Oct. 25, 1941
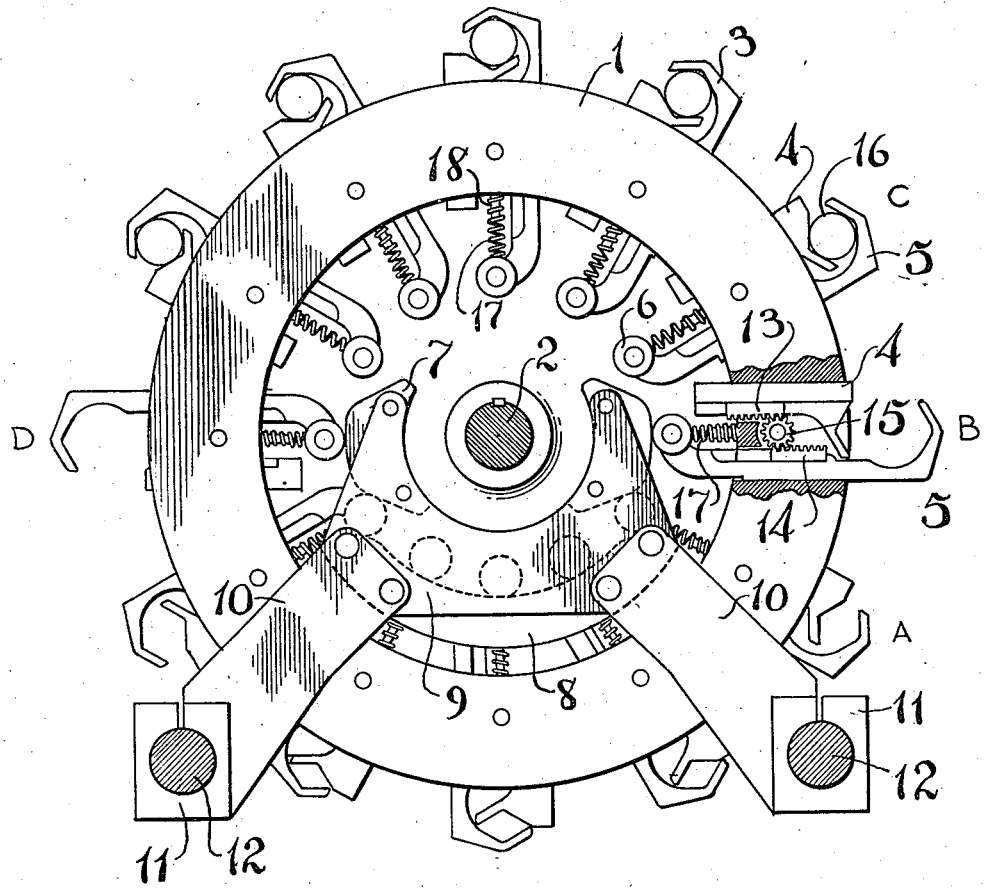
Harold H. Snyder
William P. Stuckert, INVENTORS
BY Lawrence Burns,
ATTORNEY Patented Dec. 21, 1943

2,337,528

UNITED STATES PATENT OFFICE 2,337,528

TUBE HOLDING APPARATUS

William P. Stuckert, Marblehead, Mass., and Harold H. Snyder, Pittsburgh, Pa., assignors to Sylvania Electric Products Inc., a corporation of Massachusetts Application October 25, 1941, Serial No. 416,520

3 Claims. (Cl. 198—210)

This invention relates to elongated glass envelopes and more particularly to apparatus for automatically centering them.

In the formation of necks on the ends of tubular glass envelopes and in the sealing of another glass element to the ends of said glass envelope as well as in other processes where the accurate centering of the glass envelope with respect to some other element, especially some element which is to work on said glass envelope in some manner is of paramount importance, glass envelopes which are off center or which are not perfectly straight present a serious problem.

Accordingly, an object of this invention is to provide a means for automatically centering elongated glass envelopes of various diameters.

Further objects, advantages and features will be apparent from the following specification taken in conjunction with the accompanying drawing in which:

The figure is an elevation partly in section showing the series of centering chucks and their actuating means on the centering conveyor.

The centering mechanism of this invention has been made particularly adaptable to the glass forming apparatus shown in the co-pending application Serial Number 383,586 filed March 15, 1941, but its adaptability to other apparatus and machinery where the centering of the elongated glass envelopes is of importance may be appreciated by one skilled in the art without departing from the spirit of the invention.

The annular centering chuck conveyor 1 which is keyed to the shaft 2 has a plurality of centering chucks 3 mounted therein. Each of the chucks 3 has two jaws 4 and 5. The actuation of these jaws is accomplished through the cam rollers 6, which form a part of the chuck assembly, coming in contact with the internal cams 7. The external cam 8, which serves to limit the extent to which the jaw 5 of the chuck 3 may open, along with the internal cams 7 are all mounted on the cam support 9 which is in turn supported on the brackets 10. The brackets 10 are mounted through the caps 11 on the shafts 12.

The chuck assembly is shown in section at position B to illustrate its construction. These chucks which are mounted within the conveyor 1 consist of two jaws 4 and 5 each having a bar gear 13 and 14 respectively forming a part thereof. These bar gears 13 and 14 are meshed with the spur gear 15 which is mounted therebetween.

As the conveyor 1 indexes from position A to position B, the jaw 5 of the chuck through the cam roller 6 will ride up on the cam 7. This will cause the jaw 5 to move outwardly from the conveyor 1 in which it is mounted. This outward movement is transmitted into the counter clockwise movement of the gear 15 with which it is meshed through the bar gear 14. This movement of the gear 15 will cause the jaw 4 with which it is meshed to move inwardly. By thus having both jaws move and move in opposite directions, the greatest range of chuck adjustability for different glass tube diameters is obtained with a small actuating mechanism.

In as much as the jaws 4 and 5 are mounted within the conveyor 1, there is no danger of them being thrown out of alignment during the operation. They move in and out in a well-defined path. When the conveyor indexes to station C, the elongated tube 16 which was placed within the chuck at station B is firmly gripped therein when the spring 17, suspended between the cam roller 6 and the conveyor 1, expands after having been contracted during the period when the cam roller 6 was in contact with the cam 7. These springs 17 are concentric with the studs 18 which aid in keeping the springs properly positioned.

At station D, the elongated tube is discharged from the conveyor. To prevent the jaws 5 of the chucks 3 from projecting too far out of the conveyor during the cycle from station D back to station B, the external cam 8 serves as a check thereon and provides a surface on which the cam rollers 6 may ride during this portion of the cycle. Thus the extent to which the jaw 5 will drop down is limited by the location of the external cam 8. Not only does this cam prevent the jaw 5 from dropping down to a point where it would strike the shafts 12, but it also serves to keep the jaw 5 in position in case the spring 17 which forms a part of the chuck assembly should break or become disconnected. Thus provision is made to insure that the jaw 5 only moves within certain well-defined pre-determined limits.

As was pointed out above, this mechanism is employed to automatically center elongated glass tubes which are carried thereon. When this conveyor and chuck assembly is used on the glass forming apparatus of the co-pending application, it automatically centers each piece of glass tubing with the several burners and the neck-forming devices which successively act upon the ends thereof. When the ends of a glass tube to be worked on are not perfectly round, the chucks will hold the tube in such a position with respect to the burners and the forming device that the neck which is formed on the ends thereof will be round and will not be of the same contour as it was before it was worked on by the burners and forming device. The same will hold true if the glass tube is slightly oval or if it is not perfectly straight.

This essential objective is accomplished by lining up the center line of the chucks with the center line of the burners and the forming devices at the outset. Assurance is had that these two center lines will always coincide during the operation of the apparatus because the two jaws which form each chuck both move each time a tube is placed therebetween. Since they have a common source of motivation they both move exactly the same distance at all times. Thus there is no danger of an alteration or change of the center line of the chuck.

The advantages to be gained by adopting the principle embodied in this apparatus may well be appreciated when one considers that it is readily applicable to any type of machine or apparatus in which it is desirable to automatically line up the center line of the work, which might well vary in different units of work, with the fixed predetermined center line of the element which is to operate on the work.

What we claim is:

1. In apparatus for carrying tubes or the like through a plurality of indexed steps, a carrier body and a tube centering and clamping unit thereon, said unit comprising: a spur gear pivotally mounted on said body; and a pair of clamp arms, each having a rack gear in mesh with said spur gear; one of said arms comprising a relatively short member with an outwardly facing cupped contour; and the other of said arms comprising a relatively long member having an inner, curved end with a roller pivotally mounted thereon, and an outer curved end with an inwardly facing cupped contour in opposition to said short arm cupped contour; with said long member under a tendency of inward movement through the action of a spring member having one end based on said body and the other end based on the inner end of said long member adjacent said roller.

2. In apparatus for carrying tubes or the like through a plurality of indexed steps, the combination of: a horizontal drive shaft; an annular ring mounted on said shaft for rotation therewith; a chuck mounted radially on said ring and having a pair of cooperable jaws; a cam roller attached to one of said jaws; and a cam assembly comprising a mounting below, and independent of the rotation of, said ring, a support arm on said mounting, a cam plate mounted on said support arm and lying horizontally in line with the central and lower portions only of the encompassment of said ring, and a group of cams mounted on said plate for engagement with said cam roller in the operation of said chuck; said cam group comprising a pair of inner, small arc cams vertically adjacent said drive shaft and on opposite sides thereof, and an outer cam, relatively long in arc, yet lying completely beneath said drive shaft.

3. In apparatus for carrying tubes or the like through a plurality of indexed steps, a carrier body and a tube centering and clamping unit thereon, said unit comprising: a spur gear pivotally mounted on said body; and a pair of clamp arms, each having a rack gear in mesh with said spur gear; one of said arms comprising a relatively short member with a cupped contour at its outer end; and the other of said arms comprising a relatively long member having an inner, curved end with a roller pivotally mounted thereon, and an outer curved end with a cupped contour facing in opposition to said short arm cupped contour with said long member under a tendency of movement opposite to that of said short member through the action of a spring member having one end based on said body and the other end based on the inner end of said long member adjacent said roller.

WILLIAM P. STUCKERT.
HAROLD H. SNYDER.